July 21, 1959     P. W. SANDERS     2,895,729
SERVICE STAND FOR LAWN MOWERS
Filed July 18, 1957

P. W. Sanders
INVENTOR

BY *CA Snow & Co.*
ATTORNEYS.

2,895,729

SERVICE STAND FOR LAWN MOWERS

Pressie W. Sanders, Urbana, Ohio

Application July 18, 1957, Serial No. 672,757

2 Claims. (Cl. 269—156)

This invention relates to a service stand especially designed for use in supporting four-wheeled lawn mowers during the process of repairing or sharpening the mowers.

An important object of the invention is to provide a stand of this character on which the mower to be sharpened is secured, the stand including a portable carriage and an adjustable supporting frame on which the mower is clamped for movement to various angular positions to facilitate the servicing operation.

A further object of the invention is to provide a stand for supporting a four-wheeled mower wherein the rotary blade operates in a horizontal plane, the support being of the portable type which will be held stationary against movement during the servicing of the mower, under the weight of the mower supported thereon.

Another object of the invention is to provide a rack wherein the clamping mechanism employed in clamping the wheels of the mower to the rack, is adjustable so that the clamp is capable of clamping the wheels of lawn mowers of various sizes.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawing.

Figure 1:
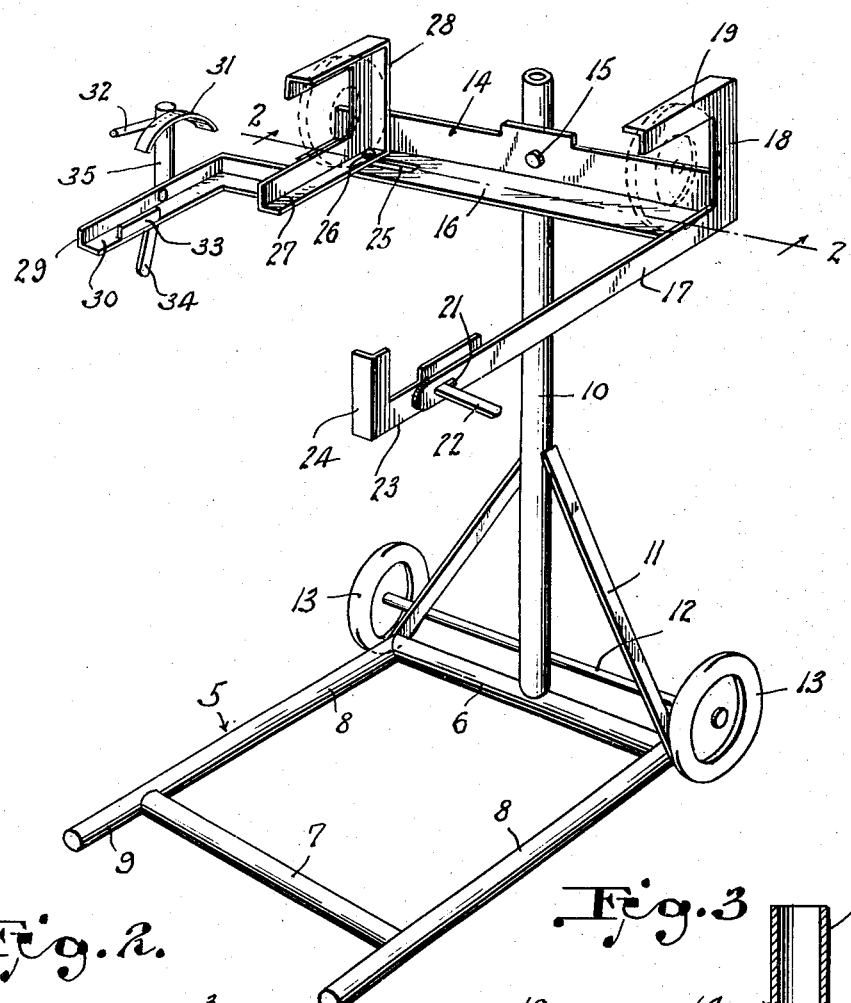
Figure 1 is a perspective view of a service stand constructed in accordance with the invention.
Figure 2:
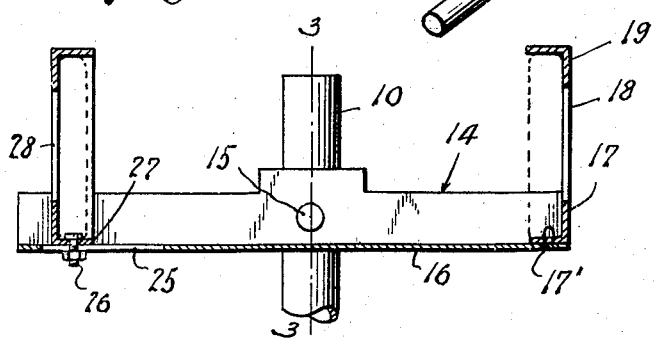
Fig. 2 is a sectional view taken on line 2—2 of Fig. 1.
Figure 3:
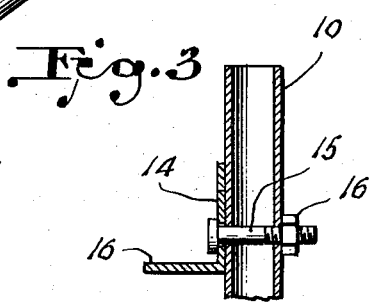
Fig. 3 is a sectional view taken on line 3—3 of Fig. 2.

Referring to the drawing in detail, the stand comprises a base in the form of a rectangular frame indicated generally by the reference character 5, the frame including an end bar 6 and an end bar 7, the end bar 7 being spaced from the outer ends of the side bars 8, as shown by Fig. 1 of the drawing, leaving extensions 9 for contact with the floor surface in preventing movement of the rack under normal conditions. Connected with the end bar 6 is a vertical post 10 which is braced by means of the angular brace bars 11 that extend from the frame 5 and connect with the vertical post 10.

The reference character 12 indicates a supporting axle which is welded to the brace bars 11, the axle supporting the wheels 13 on which the rack is mounted.

Pivotally connected to the vertical post 10, is a main horizontal supporting bar 14 secured to the post 10 by means of a bolt 15, the bolt 15 being supplied with a nut 16 which may be tightened to hold the main supporting bar in various angular positions of adjustment with respect to the post 10.

The bar 14 includes a horizontal laterally extended flange 16′ to one end of which is connected the bar 17 having an upwardly extended portion 18 terminating in a rearwardly extended portion 19.

The bar 17 is formed with an inwardly extended flange 17′ formed throughout the length thereof, the flange providing means to receive the wheels of the mower being serviced, to hold the mower in position on the rack, during the servicing operation.

The bar 17 is formed with an elongated opening 21 through which the arm 22 carried by the adjustable section 23 of the rack extends, the section 23 having a laterally extended flange resting on flange 17′ of the bar 17, providing a support for the rear wheel (not shown) of the mower being serviced. Due to this construction it will be seen that the section 23 may be adjusted longitudinally of the bar 17 to accommodate mowers of various sizes.

The adjustable section 23 is formed with an upstanding end 24 that is moved against a rear wheel of the mower mounted on the rack.

The flange 16′ of the main supporting rod 14 is formed with an elongated opening 25 through which the bolt 26 extends, the bolt 26 passing through the inwardly extended flange 27 of the supporting member 28, which is held in a vertical position to receive a front wheel of the motor, illustrated in dotted lines in Fig. 1 of the drawing, to hold the mower in position for servicing.

The supporting member 28 also includes a rearwardly extended bar 29 which is formed with an inwardly extended flange 30, the bar 29 being offset with respect to the supporting member 28, as shown by Fig. 1 of the drawing. The rearwardly extended bar 29 and its flange 30 provide a support for a rear wheel at one side of the mower, the rear wheel being clamped by means of the clamp 31, which is curved to fit over the wheel associated therewith, there being provided a handle 32 for moving the clamp 31 into clamping relation with the wheel of the mower associated therewith.

The reference character 33 indicates a removable stop bar that is substantially L-shaped, and is formed along the inner edge of the flange of the bar 29 to engage the edge of a wheel of a mower held on the stand.

The lever 34 connects with the arm 35 that is pivotally connected with the inwardly extended bar 29 for rotation thereon, to cause the clamp 31 to grip over the tread of the wheel.

From the foregoing it will be seen that due to the construction shown and described I have provided a stand on which the conventional lawn mower of the four-wheel type may be secured and shifted to various angular positions so that the repairing and sharpening of the blades of the mower may be carried out with facility. With the mower clamped on the stand in the manner described, the mower and its support may be moved to any desired angle.

Having thus described the invention, what is claimed is:

1. A mower service stand comprising a base, a vertical post rising from said base at one end thereof, a mower supporting frame including a main supporting bar bolted on said vertical post for pivotal movement about the axis of said bolt, spaced flanged rearwardly extending horizontal supporting bars having substantially U-shaped ends connected to and extended from the ends of said main supporting bar, the open sides of said horizontal bars having U-shaped ends extending rearwardly, providing support for mower being serviced, and an extension section mounted on one end of one of said horizontal bars for adjustment longitudinally of said bar of which it forms a part, and wheels on which said base is mounted.

2. A mower servicing stand comprising a base, a vertical post rising from said base at one end thereof, a mower supporting frame including a main bar bolted on said vertical post for pivotal movement about the axis of said bolt, spaced flanged rearwardly extending horizontal bars having substantially U-shaped ends, connected to and extended from the ends of said main bar, the open sides of said horizontal U-shaped ends extending rearwardly, providing supports for the mower being serviced, and an extension section mounted on the end of one of said horizontal bars for longitudinal adjustment thereon, a rearwardly and longitudinally offset flanged supporting section connected to the other horizontal bar for holding a substantially wide mower, an adjustable clamp for clamping a mower wheel on said offset flanged supporting section, and wheels on which said base is mounted.

References Cited in the file of this patent

UNITED STATES PATENTS

| | | |
|---|---|---|
| 2,168,115 | Collot | Aug. 1, 1939 |
| 2,188,433 | Friese | Jan. 30, 1940 |
| 2,275,216 | Broccoli | Mar. 3, 1942 |
| 2,658,703 | Brink et al. | Nov. 10, 1953 |